United States Patent
Larsson et al.

(10) Patent No.: US 8,633,614 B2
(45) Date of Patent: Jan. 21, 2014

(54) MODULAR ENERGY STORAGE DEVICE FOR A HIGH VOLTAGE ELECTRICAL POWER SYSTEM

(75) Inventors: Tomas Larsson, Vasteras (SE); Fredrik Tinglöw, Arboga (SE); Georgios Demetriades, Vasteras (SE); Willy Hermansson, Vasteras (SE); Konstantinos Papastergiou, Vasteras (SE)

(73) Assignee: ABB Research Ltd. (CH)

( * ) Notice: Subject to any disclaimer, the term of this patent is extended or adjusted under 35 U.S.C. 154(b) by 365 days.

(21) Appl. No.: 12/951,906

(22) Filed: Nov. 22, 2010

(65) Prior Publication Data

US 2011/0159349 A1 Jun. 30, 2011

Related U.S. Application Data

(63) Continuation of application No. PCT/EP2009/068038, filed on Dec. 30, 2009.

(51) Int. Cl.
*H02J 1/00* (2006.01)
*H01M 6/42* (2006.01)

(52) U.S. Cl.
USPC .............................. 307/77; 307/147; 429/158

(58) Field of Classification Search
USPC ..................................... 307/77, 147; 429/158
See application file for complete search history.

(56) References Cited

U.S. PATENT DOCUMENTS 8,330,301 B2 * 12/2012 Demetriades et al. ........ 307/150

FOREIGN PATENT DOCUMENTS

WO 2009152849 A1 12/2009

* cited by examiner

*Primary Examiner* — Hal Kaplan
(74) *Attorney, Agent, or Firm* — St. Onge Steward Johnston & Reens LLC

(57) ABSTRACT

Storage device for a high voltage electrical power including at least two modules connected in series, each module including at least one dc power-source in a container with positive and negative terminals. The device including positive and negative poles, first and second conductors arranged to form a current path between the poles, the first conductor including a plurality of conductor parts connected to the terminals of the modules to provide a series connection, a first module of the series being connected to one of the poles, and the second conductor is connected between a last module in the series and the other pole, wherein the conductors are arranged to pass through the containers in parallel such that a current flows through the first conductor in a first direction and through the second conductor in an opposite second direction.

6 Claims, 3 Drawing Sheets

MODULAR ENERGY STORAGE DEVICE FOR A HIGH VOLTAGE ELECTRICAL POWER SYSTEM

CROSS-REFERENCE TO RELATED APPLICATIONS

The present application is a continuation of pending International patent application PCT/EP2009/068038 filed on Dec. 30, 2009, which designates the United States and the content of which is incorporated herein by reference.

FIELD OF THE INVENTION

The present invention relates to a modular energy storage device for a high voltage electrical power system comprising at least one dc power-source unit enclosed in a container. By a high voltage electrical power system should be understood an electrical system within the range of 3 kV and upwards, preferably in the range of 10 kV and upwards. By energy storage device should be understood dc power source members connected in series to be within the range of 3 kV and upwards. One or more energy storage devices connected in parallel can for example be connected to the electrical power system via a power apparatus capable of controlling reactive power and/or active power. Examples of power apparatus are a power compensator and an uninterruptible power supply (UPS).

BACKGROUND OF THE INVENTION

Within flexible alternating current transmission systems (FACTS) a plurality of control apparatus are known. One such FACTS apparatus is a static compensator (STATCOM). A STATCOM comprises a voltage source converter (VSC) having an AC side connected to a high voltage electrical power system and a DC side connected to a temporary electric power storage means such as capacitors. The STATCOM can supply reactive power to or absorb reactive power from the transmission line.

As opposed to the STATCOM, which only compensate for reactive power, another concept is to connect a dc power source to a compact STATCOM, and thus being able to perform active power compensation. The construction may be used e.g. as a spinning reserve and for compensating for fluctuating energy levels in the power system.

Today the dc power source is a high voltage battery. Since the power apparatus is connected to the ac voltage of the high voltage electrical power system, a large number of battery cells have to be connected in series to match the dc voltage of the power apparatus. Moreover, to obtain a desired amount of electric energy (duration of active power) of the energy storage, a number of strings including a plurality of battery cells could be connected in parallel. The first conductor and the batteries themselves are typically placed at a distance to the second conductor. Since the conductors often consists of non-isolated metal bus bars this safe distance is important to prevent an accidental and contemporaneous contact of the conductors.

Furthermore, in case of a fault, such as a short-circuit, the power apparatus has to be protected. Consequently, two switches are provided in each string to disconnect the string in case the converter, a string, or a part of the string is short-circuited. One switch is able to disconnect the string from the positive dc rail of the converter and the other switch is able to disconnect the string from the negative dc rail of the converter. Each of the switches has to be rated for the entire converter voltage to be capable of protecting the power apparatus.

Up to now, mechanical dc circuit breakers have been used as switches for connection and disconnection of the strings. However, the availability of dc circuit breakers is limited and the ratings of these breakers are considerably low and less than the required voltage ratings in high voltage electrical power systems. To overcome this problem mechanical ac circuit breakers with some additional circuitry, such as a resonance circuit connected in parallel with the ac circuit breaker, have been used.

A solid-state switch is an electronic switch that, unlike a mechanical breaker, contains no moving parts. There is a desire on the market to be able to exchange the mechanical ac circuit breakers with solid-state switches as proposed in WO/2009/152849 where solid-state switches are distributed among the dc power-source units. However, high voltage power applications require large electric bus bar constructions that inevitably lead to high loop inductance. The loop inductance acts as a limiter of the current derivative (di/dt) during switching transitions. Since the turn-off of solid-state switches is much faster than the turn-off of mechanical breakers, large loop inductance implies high energy storage in the electric bus bar constructions and during fast interruption this energy will appear as a voltage spike across the switch (see equation 1 & 2). This voltage spike will have fatal effects and destroy the switches.

$$E_L = \frac{1}{2}LI^2 \qquad (1)$$

$$V_{switch} = L \cdot \frac{di}{dt} \qquad (2)$$

A known solution to reduce high voltage spikes across circuit breakers is to use additional equipment such as different kinds of snubber circuits and varistors connected to the breaker. Such additional equipment is however costly.

SUMMARY OF THE INVENTION

It is an object of the invention to overcome or at least alleviate the above-mentioned problems. In particular, it is an object of the invention to provide an improved energy storage device for a high voltage electrical power system.

According to one aspect of the invention this object is achieved by a modular energy storage device as defined in claim 1.

The modular energy storage device for a high voltage electrical power system according to the invention is characterized in that it comprises at least two modules connected in series, each module including at least one dc power-source unit enclosed in a container and a positive and a negative terminal, and the device further comprising a positive and a negative pole, a first and a second conductor arranged to form a current path between the positive and negative poles, the first conductor including a plurality of conductor parts connected to the terminals of the modules to provide a series connection of the modules, a first module of the series connection of the modules being connected to one of the poles, and the second conductor is connected between a last module in the series connection of modules and the other pole, wherein the first and second conductors are arranged to pass through the containers in parallel such that a current flows through the first conductor in a first direction and through the second conductor in a second direction opposite to the first direction.

An advantage with the modular energy storage device according to the invention is that by arranging the first and second conductor to pass through the containers in parallel, the distance between the conductors will be reduced leading to a reduced loop inductance and hence a reduced voltage spike will appear across the switch when the energy storage device is disconnected (see equation 2). As a result the rating of the disconnecting solid-state switch can be reduced. A further advantage is a minimised need for snubber circuits and varistors, the ratings of which at least can be significantly decreased. Additional advantages are that the energy storage device is compact, modular and has a flexible design.

With a dc power-source unit is meant a plurality of series- and/or parallel-connected dc power source members. With a dc power source member is meant a small entity capable of providing dc power, such as a battery cell, a photovoltaic cell, a fuel cell, a flywheel or a super capacitor. Different types of dc power source members could also be combined in the dc power source.

In an embodiment of the invention, at least one of the conductors comprises an insulated cable. An advantage with the use of an insulated cable is that electrical insulation of the conductor is automatically achieved. Hence the conductors can be placed with a very short distance to each other or even surface to surface in order to minimise the loop inductance of the energy storage device. Additionally, the insulation between the conductor and the container will be improved. A further advantage is that the degree of safety increases since the cable insulation prevents a person from having accidental contact with the conductor.

In an embodiment of the invention both conductors comprise an insulated cable. An advantage with the use of insulated cables is that electrical insulation of the conductors is automatically achieved. Hence the conductors can be placed with a very short distance to each other or even surface to surface in order to minimise the loop inductance of the energy storage device. Moreover, the insulation between the conductors and the container will be improved. An additional advantage is that less isolation is required when both the conductors comprise an isolated cable.

In an embodiment of the invention the first conductor comprises a metal tube, in the following denoted tube, surrounding the second conductor. For example, the second conductor is a cable. An advantage with this embodiment is that the loop inductance will be even smaller compared with parallel conductors. Accordingly, the snubber circuit ratings, the varistor ratings and the solid-state switch ratings can be further reduced. This embodiment also minimises the risk of module short-circuits due to the fact that the second conductor is enclosed by the first conductor. This solution also provides for an easy installation procedure where a standard insulated high voltage cable easily can be pushed through the tube to form the return path of the current.

In an embodiment of the invention the second conductor comprises a second tube arranged with the envelope surface at a distance from the tube of the first conductor such that an electrical isolation is achieved between the tubes. One advantage with this embodiment is that the copper utilization is minimised.

In an embodiment, each module provides DC voltage at 1-10 kV, preferably between 2 and 5 kV or approximately 3 kV. The energy storage device can be dimensioned for voltages between 10 kV and 100 kV, or even more than 100 kV. In an embodiment each battery unit provides between 50 and 1000 volts, such as more than 100 volts and/or lower than 500 volts, especially between 150 and 350 volts or approximately 250 volts. Twelve 250-volt battery units create a module voltage of 3 kV. Each module includes preferably more than three battery units, such as more than five or seven units, or more than ten units, such as twelve battery units or more.

In an embodiment of the invention the distance between the envelope surfaces of the first and second conductor does not exceed 20 cm.

One or more energy storage devices connected in parallel can for example be connected to the electrical power system via a power apparatus capable of controlling reactive power and/or active power. Examples of power apparatus are a power compensator and an uninterruptible power supply (UPS).

BRIEF DESCRIPTION OF THE DRAWINGS

The present invention will be more fully described by way of example with reference to the accompanying drawings in which.

DETAILED DESCRIPTION OF THE INVENTION

Figure 1:
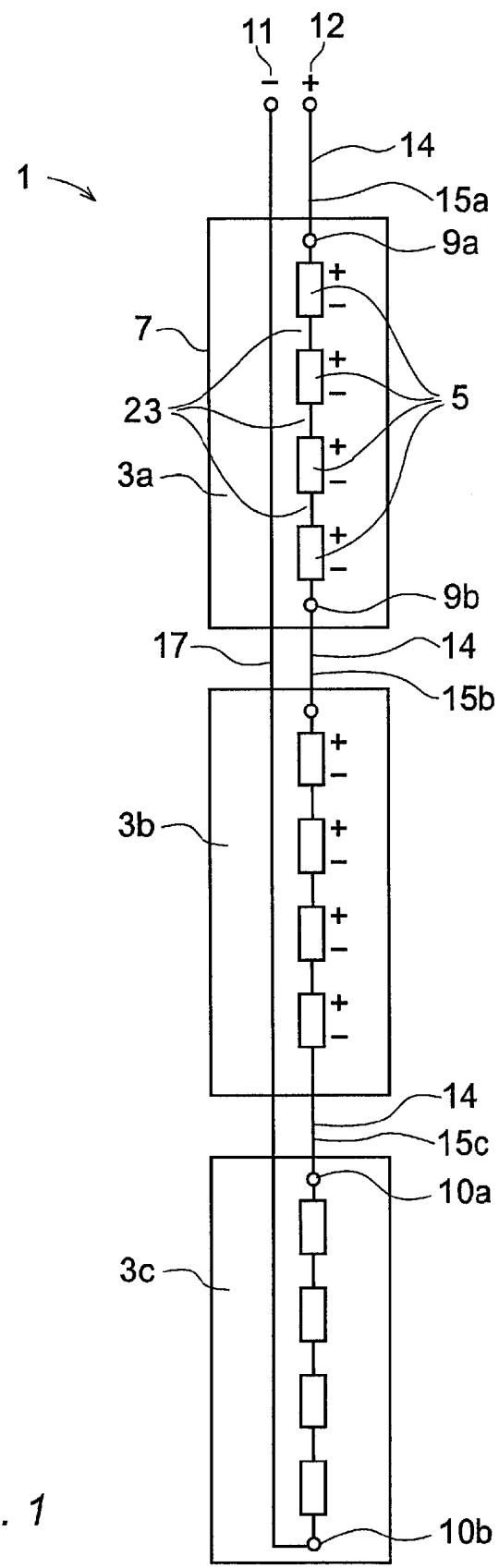
FIG. 1 shows a schematic figure of a first embodiment in accordance with the invention.

FIG. 1 shows a modular energy storage device 1 for a high voltage electrical power system according to a first embodiment of the invention. High voltage electrical power systems can be networks for transmission or distribution of electrical energy as well as industries, hospitals and such. The same reference numerals are used throughout the figures for same or corresponding parts. The modular energy storage device includes two or more modules connected in series. The storage device 1 shown in FIG. 1 has three modules 3a-c. However, the number of module can be less or more than three. Each module 3a-c includes at least one dc power-source unit 5 enclosed in a container 7 and a positive 9a 10a and a negative 9b 10b terminal. The number of dc power-source units may vary. The device 1 further includes a positive 12 and a negative 11 pole, a first conductor 14 in the form of an insulated cable including a plurality of insulated cable parts 15a-c connected to the terminals 9a-b 10a-b of the modules 3a-c to provide a series connection of the modules 3a-c, and a second conductor 17 in the form of an insulated cable connected to the negative terminal 10b of the last module 3c in the series connection of modules 3a-c. Alternatively, the second conductor 17 can be connected to the positive terminal 9a of the first module 3a in the series connection of modules 3a-c. Series equipment devices such as switches (not shown) and dc power-source units 5 are connected in series with conductor parts 23 in the form of insulated cables thereby closing a current path between the positive 12 and negative 11 pole through the first 14 and second insulated cable 17. The first 14 and second 17 insulated cables are arranged to pass through the containers 7 in parallel such that a current flows through the first insulated cable 14 in a first direction and through the second insulated cable 17 in a second direction opposite to the first direction. High voltage insulated cables are suitable for this purpose.

Figure 2:
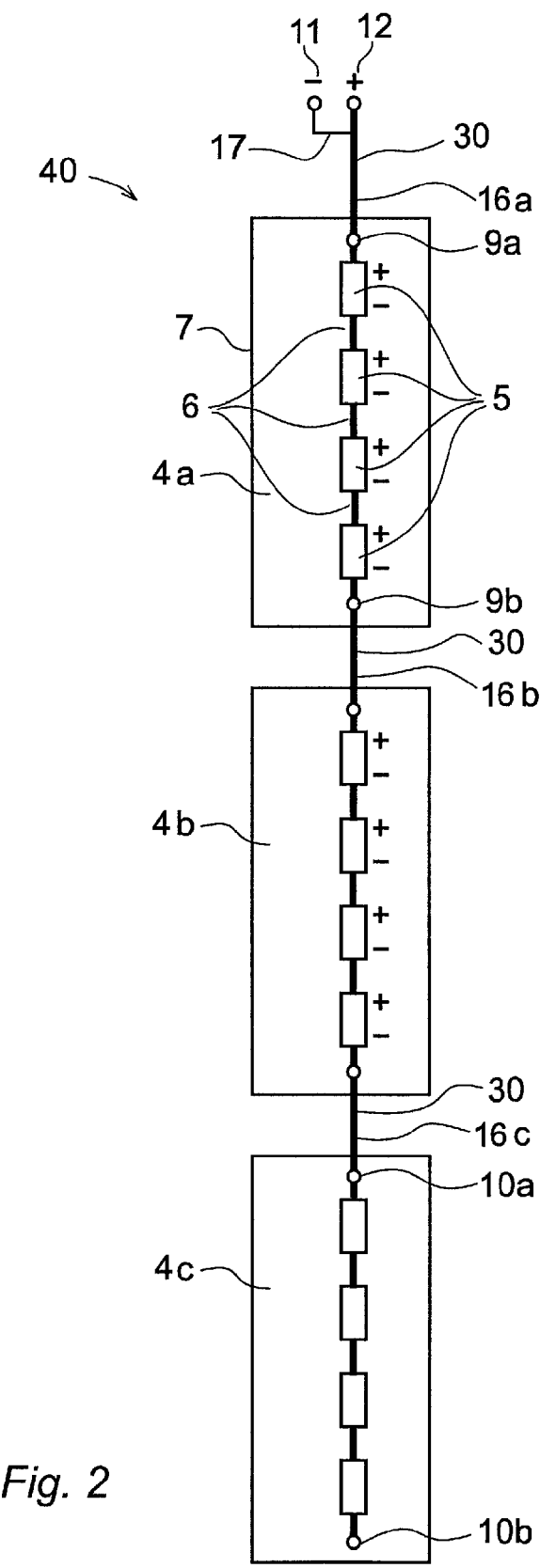
FIG. 2 shows a schematic figure of a second embodiment in accordance with the invention.

FIG. 2 shows a modular energy storage device 40 for a high voltage electrical power system according to a second embodiment of the invention. The storage device 40 includes a first conductor 30 in the form of a conducting tube 30 which comprises a plurality of tube parts 16a-c connected to the terminals 9a-b 10a-b of the modules 4a-c to provide a series connection of the modules 4a-c, and a second conductor 17 connected to the negative terminal 10b of the last module 4c in the series connection of modules 4a-c. Alternatively, the second conductor 17 can be connected to the positive terminal 9a of the first module 3a in the series connection of modules 4a-c. The second conductor 17 is enclosed in the first conductor 30. The first tube 30 further comprises a plurality of tube parts 6 which interconnects the series equipment devices such as switches (not shown) and the dc power source units 5 thereby closing a current path between the positive 12 and negative 11 pole through the first 30 and second conductor 17. The first tube 30 and second conductor 17 are arranged to pass through the containers 7 in parallel such that a current flows through the first tube 30 in a first direction and through the second conductor 17 in a second direction opposite to the first direction. The second conductor 17 includes in one embodiment a metal tube. Suitable material for the tubes are copper, aluminium or the like. In another embodiment the second conductor 17 includes an insulated cable.

Figure 3:
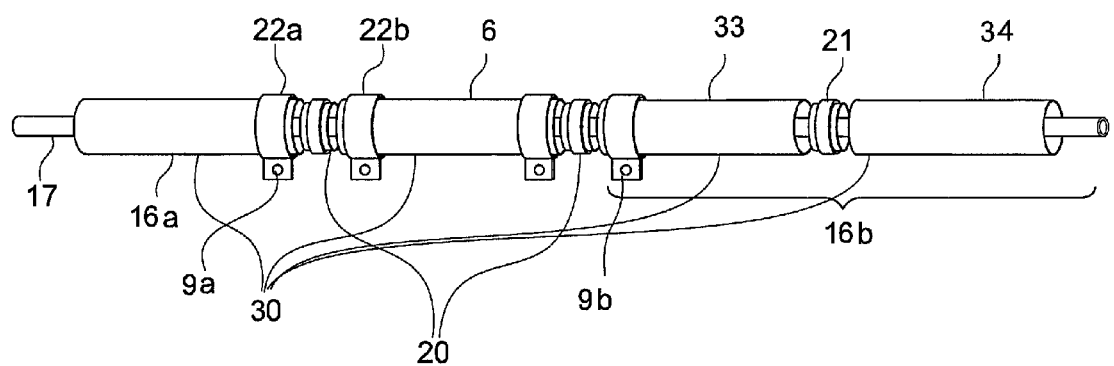
FIG. 3 shows a first and second conductor of the second embodiment in more detail.

FIG. 3 shows a part of the first tube 30 and the second conductor 17 which is enclosed in the first tube 30. The figure shows the tube part 16a which connects the first module 4a to the positive pole (not shown in FIG. 3) and the tube part 16b which connects the first module 4a to the second module 4b. Between said tube parts 16a-b another tube part 6 is shown. This tube part 6 interconnects the series equipment devices such as switches and dc power source units 5 (not shown in FIG. 3) thereby closing the current path of the energy storage device. There may be several tube parts 6 depending on the number of series equipment devices. Tap-off devices 22a-b are used to connect the series equipment devices to the first tube 30. Between the two corresponding tap-off devices 22a-b an insulating spacer 20 of a non-conducting material is placed in order to not short-circuit the series equipment device. The series-connection of two modules is achieved by a connector 21 of a conducting material such as copper or aluminium. Accordingly, the tube part 16b which connects the first 4a and second 4b modules includes two tube parts 33-34 and the connector 21. In one embodiment the second conductor 17 is a metal tube and in another embodiment the second conductor 17 is an insulated cable.

What is claimed is:

1. A modular energy storage device for a high voltage electrical power system comprising at least two modules connected in series, each module including at least one dc power-source unit enclosed in a container and a positive and a negative terminal, and the device further comprising a positive and a negative pole, a first and a second conductor arranged to form a current path between the positive and negative poles, the first conductor including a plurality of conductor parts connected to the terminals of the modules to provide a series connection of the modules, a first module of the series connection of the modules being connected to one of the poles, and the second conductor is connected between a last module in the series connection of modules and the other pole, wherein the first and second conductors are arranged to pass through the containers in parallel such that a current flows through the first conductor in a first direction and through the second conductor in a second direction opposite to the first direction.

2. The energy storage device according to claim 1, wherein the second conductor comprises an insulated cable.

3. The energy storage device according to claim 1, wherein the first conductor comprises an insulated cable.

4. The energy storage device according to claim 1, wherein the first conductor comprises a metal tube surrounding the second conductor.

5. The energy storage device according to claim 4, wherein the second conductor comprises a second metal tube arranged with an outer surface at a distance from the metal tube of the first conductor such that an electrical isolation is achieved between the tubes.

6. The energy storage device according to claim 5, wherein the distance between the outer surface of the second conductor and an inner surface of the first conductor does not exceed 20 cm.

* * * * *